July 31, 1934.  I. R. METCALF  1,968,415
CONVEYING MECHANISM FOR STITCHING MACHINES AND THE LIKE
Filed Jan. 10, 1931  3 Sheets-Sheet 1
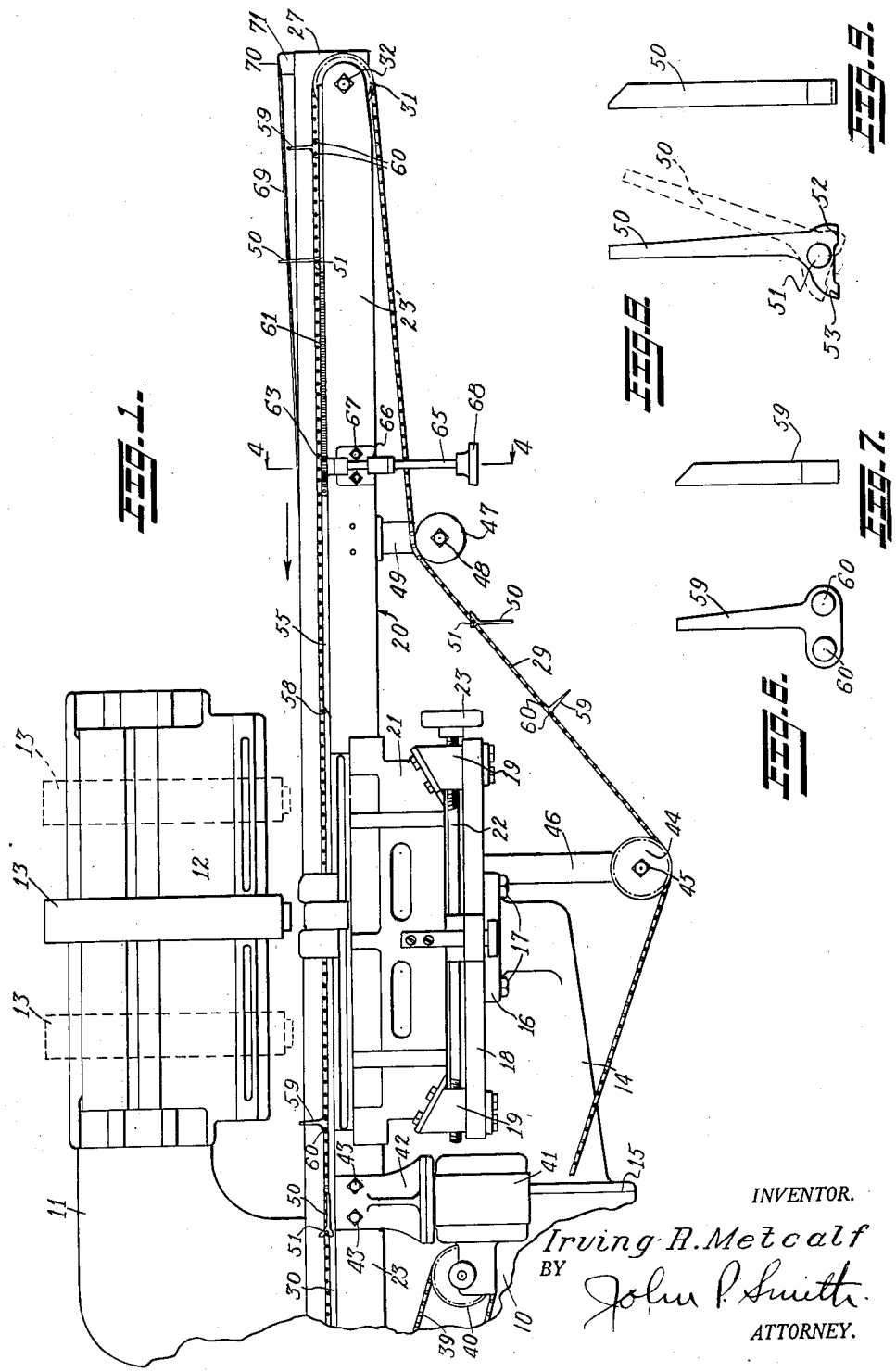
INVENTOR.
Irving R. Metcalf
BY John P. Smith
ATTORNEY.

July 31, 1934.   I. R. METCALF   1,968,415
CONVEYING MECHANISM FOR STITCHING MACHINES AND THE LIKE
Filed Jan. 10, 1931   3 Sheets-Sheet 2
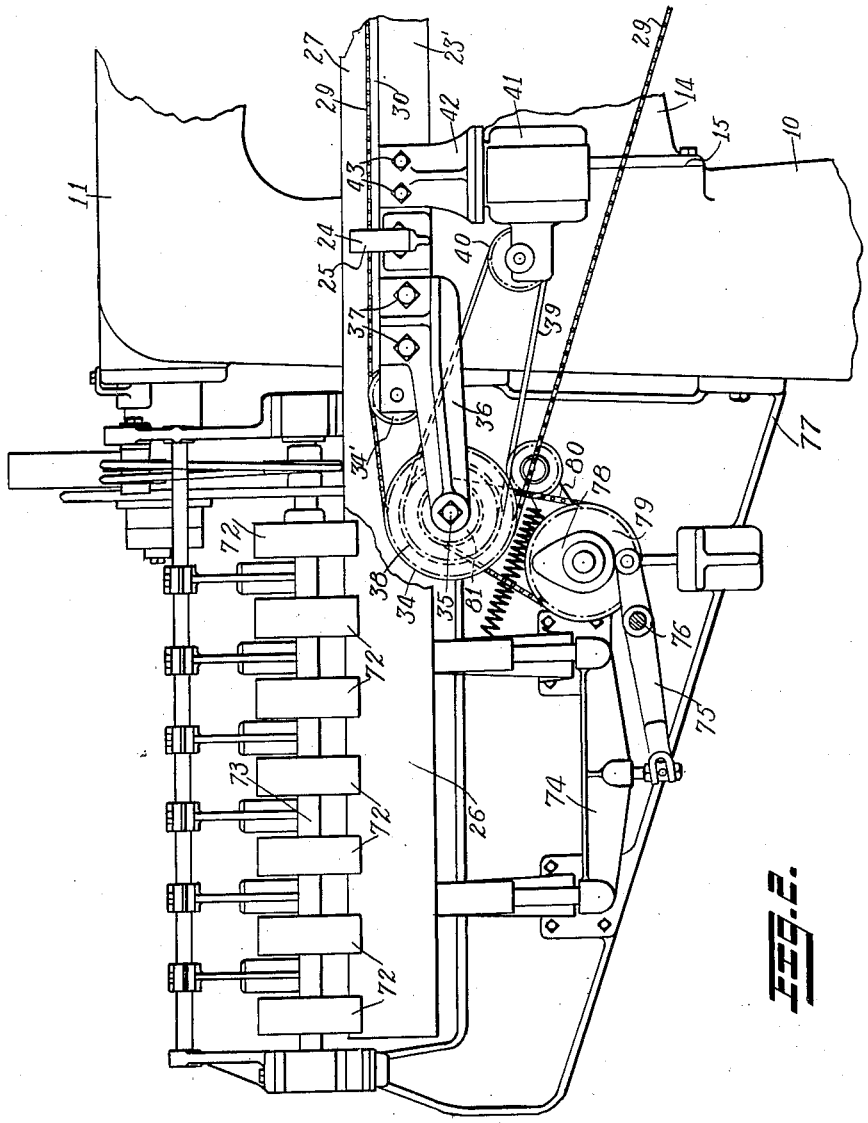
INVENTOR.
Irving R. Metcalf
BY John P. Smith
ATTORNEY.

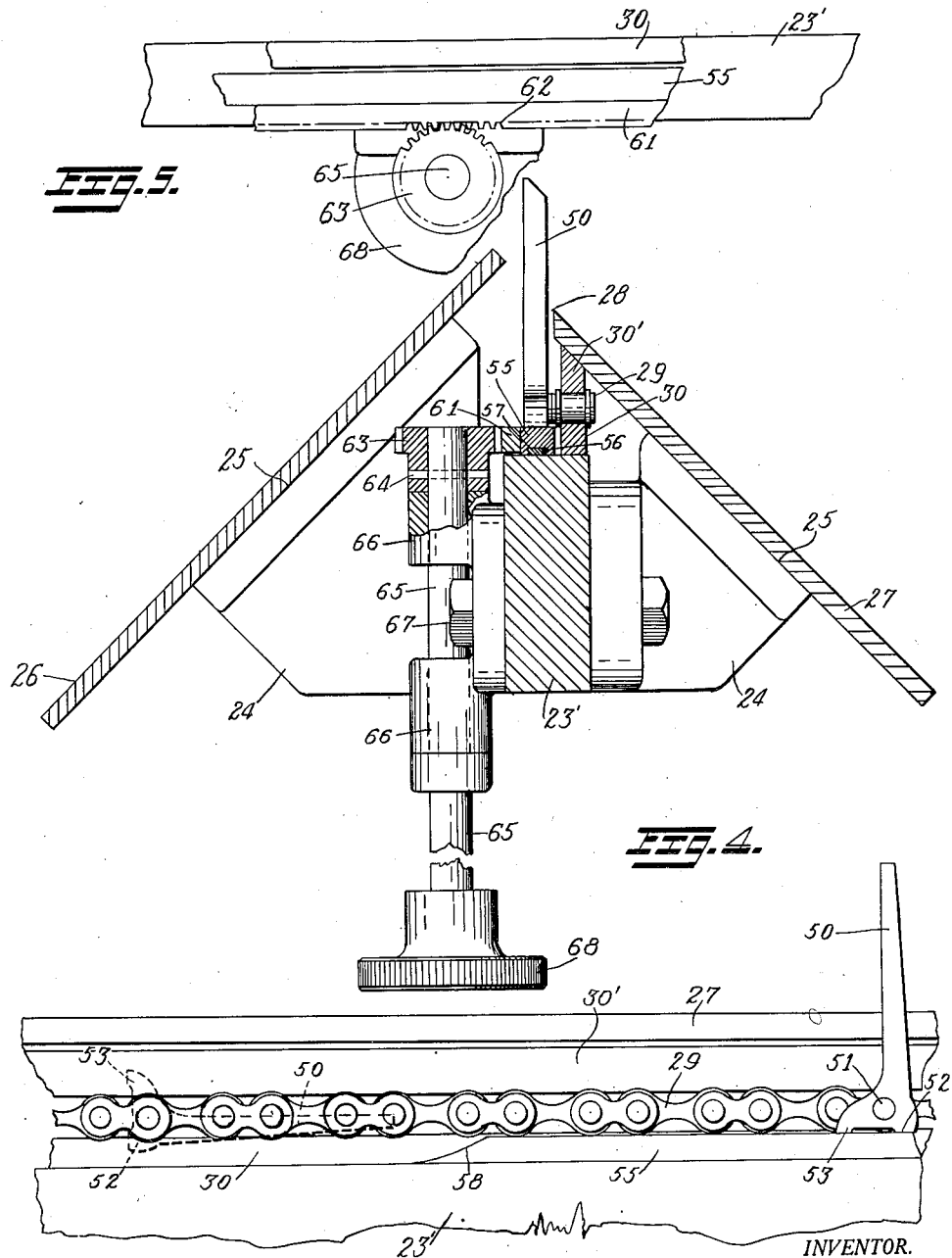

Patented July 31, 1934

1,968,415

UNITED STATES PATENT OFFICE 1,968,415

CONVEYING MECHANISM FOR STITCHING MACHINES AND THE LIKE

Irving R. Metcalf, St. Charles, Ill., assignor, by mesne assignments, to Boston Wire Stitcher Company, Warwick, R. I., a corporation of Maine Application January 10, 1931, Serial No. 507,785

18 Claims. (Cl. 1—7)

The present invention is directed generally to a conveying mechanism for the conveying of material to be worked upon where the material must be momentarily stopped and subsequently moved forwardly. This invention is particularly adaptable for the conveying of pamphlets, booklets and the like material to stitching machines and the like machines.

One of the objects of the present invention is to provide a simple, novel and improved form of a conveying mechanism for conveying paper pamphlets, books or other similar material by means of which a wide range of adjustment is permitted so as to accommodate various sizes of materials to be worked upon and in which a minimum amount of time and labor is required on the part of the operator to make the adjustment.

A further object of the invention is to provide a novel and improved conveying mechanism for stitching machines and the like whereby continuously travelling endless belt intermittently feeds the material to the stitching mechanism.

These and other objects are accomplished by providing a construction and an arrangement of the various parts in the manner hereinafter described and particularly pointed out in the appended claims.

Referring to the drawings:

Fig. 1 is a side elevational view of a fragmentary portion of a stitching machine embodying my improved conveying mechanism thereon;

Fig. 2 is a side elevational view of a stitching machine and is a complementary part of the machine shown in Fig. 1;

Fig. 3 is a side elevational view of the conveyor chain showing the construction and operation of the conveying fingers;

Fig. 4 is an enlarged cross sectional view taken on the line 4—4 in Fig. 1 showing the construction of the adjusting mechanism for controlling the operation of the conveying fingers;

Fig. 5 is a top plan view of the adjusting mechanism shown in Fig. 4;

Fig. 6 is an enlarged side elevational view of one of the relatively short conveying fingers;

Fig. 7 is an end elevational view of the conveying fingers shown in Fig. 6;

Fig. 8 is a large side elevational view of the relatively long conveying fingers; and Fig. 9 is an end elevational view of the fingers shown in Fig. 8.

In illustrating one form of my invention, I have shown the same in connection with a stitching mechanism of the multiple head type which comprises a main frame or standard 10 having a laterally extending arm 11 formed integrally therewith. The arm 11 is provided with a vertical plate 12 to which a plurality of narrow stitcher heads 13 may be secured in a manner well understood in the art. Three of such stitcher heads 13 are shown in Fig. 1 of the drawings, two of which are shown in dotted lines, but a larger or even lesser number of these heads may be operatively secured to the plate 12 for stitching the desired number of stitches in the pamphlets or books passing thereunder. Each of these stitcher heads 13 of course is provided with the usual staple forming, driving and feeding mechanism, and are of the construction preferably shown in the I. R. Metcalf et al. Patent No. 1,762,235 issued June 10, 1930. These stitcher heads 13 are operatively driven in unison and are controlled by a mechanical or an electrical trip positioned in the path of the moving booklet or material moving along the saddle plates in a manner well understood in the art. The construction thus far described per se forms no part of the present invention except in combination with my improved conveying mechanism hereinafter described.

My novel and improved conveying mechanism is supported on a laterally extending bracket or arm 14 which is secured to vertically extending flat portion 15 of the main frame standard 10 and supports the conveying mechanism directly under the stitcher heads 13 of the stitching machine. The outer end of the arm or bracket 14 is provided with a horizontal flange or plate 16 which is secured by means of bolts 17 and a horizontal flat bar 18. Adjustably secured to the horizontal bar 18 by means of adjustable wedge members 19, is my improved conveyor frame, generally indicated by the reference character 20. This specific mechanism for adjusting work table with respect to the stitcher heads is the subject of a separate application and a more detailed description will be found in this co-pending application filed under Serial No. 508,831, Jan. 15, 1931; for that reason it will only be referred to briefly here.

Adjustably supported on the wedge blocks 19 is a work table supporting member generally indicated by the reference character 21. This member 21 is vertically adjustable with respect to the longitudinal bar 18 by means of oppositely disposed wedge blocks 19, which are longitudinally movable on the bar 18 through the medium of a hand screw 22, which has its opposite ends thereof mounted in threaded engagement with each of the blocks 19. The outer end of the screw 22 is provided with a hand wheel 23 for manipulating the screw. Secured to the upper end of the member 21 and extending longitudinally thereof and projecting beyond the opposite ends thereof is a relatively long longitudinally extending bar or frame member 23'. Secured to the frame member 23' at spaced apart intervals are spaced apart saddle brackets 24, which are provided with beveled surfaces as shown at 25 for securing and supporting thereon the work table or saddle plates 26 and 27. (See Fig. 4.) These saddle plates 26 and 27 extend longitudinally of the frame of the machine and are arranged to form a substantially inverted V-shaped support as clearly shown in Fig. 4 of the drawings for supporting thereon books and pamphlets and the like to be conveyed to the stitching mechanism by my improved conveying mechanism hereinafter described.

The saddle plate 26 extends upwardly to the apex or point forming an intersection of the upper surface of each of the saddle plates 26 and 27, and the saddle plate 27 is provided with a cut out portion as shown at 28 adjacent the apex of the planes of the two plates so as to form substantially a longitudinal slot throughout the entire length of the work table for the purpose of permitting the conveying fingers to protrude therethrough.

My improved conveying mechanism comprises a continuously travelling endless chain which is adapted to intermittently feed material such as books, pamphlets and the like so that they may be worked upon, as for example, the feeding of books or pamphlets to a stitching mechanism, which must be necessarily stopped intermittently for the purpose of placing the staples or stitches in the same. This improved conveying mechanism comprises an endless chain 29 which has its upper lap thereof lying in a horizontal plane throughout the entire length of the saddle frame 23 and is adapted to be guided between two longitudinally extending metal strips 30 and 30', the lower one of which is secured to the longitudinal frame member 23'. The upper metal strip 30' has a beveled portion and is secured to the inclined saddle plate 27. One end of this endless chain 29 is trained about a pulley 31 journaled on a bolt 32, secured to one end of the longitudinal frame members 23'. The other end of the chain is trained about a slightly depressed sprocket wheel 34 journaled on a pin or bolt 35 which in turn is secured to a bracket arm 36 secured by means of bolts 37 to the frame member 23'. The chain 29 is deflected off the end of the frame member 23' by an intermediate idler pulley 34'. Formed integrally with the sprocket wheel 34 is a pulley 38 which is geared by means of a belt 39 to a drive pulley 40, which in turn is operatively driven by an electric motor 41 in a manner well understood in the art. Electric motor 41 is secured to the frame member 23' by means of a bracket 42 and bolts 43. Electric motor here shown forms the operating or driving means for driving the endless chain 29. The lower lap of the endless chain 29 is trained about an idler sprocket 44 which in turn is journaled on a stud 45 adjustably secured to a downwardly extending arm 46 which has its upper ends secured to the frame member 23'. The idler sprocket 44 may be adjusted vertically on the arm 46 for varying the tension on the endless chain 29. A second idler sprocket 47 is journaled on a pin or bolt 48 which in turn is secured to a downwardly extending arm 49 secured to the frame member 23'. The idler sprocket 47 is sufficiently narrow to engage the pins between the connecting links of the chain so as to permit the fingers 50 and 59 to pass on the front side of the sprocket 47 as clearly shown in Fig. 1 of the drawings. The purpose of this idler sprocket 47 is to deflect the lower lap of the chain so as to confine a portion of it directly under the saddle plates or table of the stitching machine.

One of the important features of my improved conveying mechanism involves the use of a continuously travelling endless belt for intermittently feeding the work to the stitching mechanism and also a simple adjustment of the same so that different lengths of material or work may be fed to the stitching mechanism intermittently. This mechanism comprises a plurality of relatively long fingers 50 which are pivoted at spaced apart intervals throughout the entire length of the endless belt 29 to certain links of the belt by means of the regular pins 51 which forms the pivots of the links of the chain 29. Each of these fingers 50 are provided with a relatively short heel portion as shown at 52 and a relatively longer and forwardly extending toe portion as shown at 53. The bottom of these toes 53 and heel portion 52 are provided with flat surfaces occupying the same plane and are adapted to engage and ride upon the upper surface of a longitudinally adjustable flat bar or finger trip member 55. The adjustable bar 55 is provided on its lower side with a dove tail recess as shown at 56 which is adapted to engage a complementary dove tail projection 57 secured to the upper surface of the frame member 23'. One end of the finger trip member 55 is curved and beveled as shown at 58 so that when the lower surfaces of the heels 52 of the relatively long conveying fingers 50 passes off the end of the adjustable trip 55, the finger 50 will swing rearwardly about its pivot 51 on the chain links 29 because each pivot 51 of the fingers 50 is located forwardly and the weight of the fingers will cause the same to swing rearwardly to a horizontal position as shown in dotted lines in Fig. 3, thereby permitting the material being conveyed to the stitching mechanism to be momentarily stopped so that the same may be stitched. The material being worked upon will remain under the stitching mechanism until such time as it is engaged by and moved by the next succeeding and relatively shorter fingers 59, which are secured to and at spaced apart intervals and between the longer finger 50, on the chain link of the chain 29. The relatively short conveying fingers 59 are secured at spaced intervals to the links of the endless belt 29 by the regular pins 60 which form the pivotal connections for certain adjacent links of the chain.

Another important feature of the present invention consists of providing means whereby the conveying mechanism may be so adjusted so as to permit the feeding of pamphlets or material to be worked upon of varying lengths, by adjusting the trip which permit the relatively long pawls or fingers to swing rearwardly to a position out of engagement with the material at relatively different distances from the stitching mechanism of the machine. It will be noted in this connection also that the heads may be adjusted relatively to each other to vary the intervals or space between the stitches or if it is found necessary, additional stitcher heads may be placed in the machine to increase the number of stitches simultaneously stitched in one pamphlet. This mechanism comprises a rack bar 61 secured to one side of the longitudinally extending adjustable trip member 55. This rack bar 61 is provided with a plurality of teeth 62 which meshes with a pinion 63, which in turn is secured by means of a pin 64 to a vertically extending shaft 65. The shaft 65 is journaled in a bearing bracket 66 secured by means of bolts 67 to one side of the longitudinally extending frame member 23' as clearly shown in Fig. 4 of the drawings. The lower end of the shaft 65 is provided with a hand grip or disc 68 through the medium of which the shaft 65 may be manually turned for longitudinally adjusting the trips bar 55 with respect to the stitching mechanism.

Another important feature of the present invention contemplates the use of a novel station for supporting the material to be worked upon, above the relatively short fingers 59. In this connection I have provided a station in the form of a longitudinally and slightly inclined wire or support member 69, which is secured at the outer end, as shown at 70, to a vertically extending bracket 71 which in turn has its lower ends secured to the saddle members 26 and 27. This outer end of this pamphlet supporting member or station 69 is held above the relatively short conveying fingers 59 so as to permit the pamphlets to be supported above the short fingers, but is below the upper end of the relatively long fingers 50 so that the pamphlets may be conveyed therealong on each occasion when a pamphlet is placed on the station. The other end of the wire is attached to one of the saddle plates 27 at a point relatively below its other end as clearly shown in Fig. 1 so that at the time the pamphlet reaches the forwardmost end of the wire or station 69 it then comes in contact with the apex of both the saddle plates 26 and 27 and is then in position to be engaged by the relatively short fingers 59 of the conveying chain 29.

The piling mechanism generally indicated by the reference character 26 is of the conventional form and briefly comprises a plurality of pairs or sets of flat rim wheels 72 secured to shafts 73 (only one of which is shown in the drawings). The periphery of these wheels are yieldingly pressed together to impinge the pamphlets therebetween and elevate them from a vertically reciprocal pamphlet carrying member generally indicated by the reference character 74. The member 74 is reciprocated by a lever 75 pivoted on a pin 76 secured to the supporting arm 77 which also forms the main support for the piler. The lever 76 is driven by a cam 78 which is formed integrally with a pulley 79. The pulley 79 is driven by a belt 80 which in turn is trained about a drive pulley 81 formed integrally with the pulley 38. Since this piling mechanism forms no part of the present invention, it is believed that a more detailed description of the same is unnecessary.

The operation of my improved conveying mechanism is as follows: Let us assume that the operator has placed the pamphlets or other material to be worked upon with the creased edges thereof resting on the wire or station 69. In this position the free ends of the pamphlets will rest upon the saddle plates 26 and 27. As the conveyor chain travels in the direction indicated by the arrow in Fig. 1, a relatively long conveyor finger 50 will protrude above the wire 69 and engage the rear ends of the pamphlets and convey them longitudinally along the wire until the conveyor finger 50 reaches the beveled end 58 of the longitudinally adjustable trip 55, at which time the heel 52 of the conveying finger 50 slides off the inclined portion 58 of the trip 55, causing the finger to fall rearwardly to assume substantially a horizontal position beneath the upper edges of the saddle plates 26 and 27. Simultaneously a trip will engage the pamphlets to throw the stitching mechanism 13 into operation as the pamphlet momentarily stops to be stitched. Subsequent to the stitching operation, the relatively short finger 59 which follows the relatively long finger 50 will then engage the pamphlet to convey it longitudinally from the stitching mechanism to the piling mechanism. Should the operator be desirous of stitching a larger pamphlet or relatively longer one, the trip 55 may be moved longitudinally rearwardly by turning the hand disc 68 which through the pinion 63 engages the rack 61 and moves the trip 55 rearwardly or in direction reverse from that shown in the arrow in Fig. 1. At the same time a larger number of stitcher heads 13 may be inserted in the head if a greater number of stitches are required in the pamphlet. It is quite obvious that if the relatively long fingers 50 are permitted to become disengaged at a point from the stitcher head that a relatively longer pamphlet may be stitched and conversely if the relatively shorter pamphlet is required to be stitched, the trip 55 may be moved in a direction toward the stitching mechanism.

While in the above specification I have described one embodiment which my invention may assume in practice, it will be understood of course, that modification may be made without departing from the spirit and scope of the invention as expressed in the following claims.

What I claim as my invention and desire to secure by Letters Patent is:

1. A conveying mechanism for stitching machines and the like comprising a frame, a continuously driven endless chain mounted on said frame, short and long fingers carried by said chain, certain of said fingers being movable with respect thereto for intermittently moving material across said frame, and means for supporting the material out of the path of travel of said short fingers and in the path of travel of said long fingers.

2. A conveying mechanism for stitching machines and the like comprising a frame, a continuously driven endless belt mounted on said frame, short and long fingers carried by said belt, said long fingers being pivoted to said belt for intermittently moving material across said frame, and means for supporting the material in a position to be engaged only by said long fingers.

3. A conveying mechanism for stitching machines and the like comprising a frame, a continuously driven endless belt mounted on said frame, spaced apart pivoted fingers carried by said belt, spaced apart fixed fingers carried by said belt and located between said pivoted fingers, said fixed fingers being relatively shorter than said pivoted fingers, means mounted on said frame and engageable with said pivoted fingers for controlling the same whereby the material may be intermittently moved across said frame, and a station mounted on said frame for holding the material in a position out of engagement with said fixed fingers and in a position to be engaged by said pivoted fingers.

4. A conveying mechanism for stitching machines and the like comprising a frame, a continuously driven endless chain mounted on said frame, relatively long pivoted and relatively short fixed fingers carried by said chain for intermittently moving material across said frame, means carried by said frame for varying the lengths of the intermittent movements of the material across said frame, and means whereby the material may be held in a position out of engagement with said short fingers and in engagement with said long fingers 5. A conveying mechanism for stitching machines and the like comprising a frame, a continuously driven endless chain mounted on said frame, spaced apart relatively long pivoted fingers carried by said chain, spaced apart relatively short fixed fingers carried by said chain and located between each of said pivoted fingers, means carried by said frame and engageable with said pivoted fingers whereby the action of said pivoted fingers may be controlled, and a station positioned over said fingers for holding the material in a position out of engagement with said short fingers and in engagement with said long fingers.

6. A conveying mechanism for stitching machines and the like comprising a frame, a continuously driven endless belt mounted on said frame, relatively short fixed and relatively long movable fingers carried by said belt, a station located over said fingers for supporting material thereon whereby said long fingers only, may move the material therealong, and means mounted on said frame and engageable with said relatively movable fingers for controlling the movement of the same whereby material is intermittently moved across said frame.

7. A conveying mechanism for stitching machines and the like, comprising a frame, a continuously driven endless chain mounted on said frame, relatively short fixed and relatively long movable fingers spaced apart and carried by said chain, adjustable means carried by said frame and engageable with said relatively movable fingers for controlling the movement of said movable fingers with respect to said chain at predetermined positions along the travel of said movable fingers across said frame, and a station positioned over said fingers for holding the material out of engagement with said short fingers 8. A conveying mechanism for stitching machines and the like comprising a frame, a continuously travelling endless chain mounted on said frame, a plurality of spaced apart fingers carried by said chain and movable relatively with respect thereto, a plurality of relatively fixed fingers carried by said chain and each being located between said relatively movable fingers, an adjustable trip mounted on said frame and engageable with said relatively movable fingers for determining the location at which said relatively movable fingers become disengaged from the material being conveyed across said frame, and manually operable means mounted on said frame and engageable with said trip for adjusting the same longitudinally of said frame.

9. A conveying mechanism for stitching machines and the like comprising a frame, a continuously driven endless belt mounted on said frame, a plurality of relatively short fingers carried by said belt, a plurality of relatively long pivoted fingers carried by said belt and located between said relatively short fingers, a station above said fingers above which said long fingers protrude and a longitudinally adjustable trip engageable with said pivoted fingers for determining the position to which said relatively long fingers travel before they become disengaged from the material being conveyed across said frame.

10. A conveying mechanism for stitching machines and the like comprising a frame, a continuously driven endless belt mounted on said frame having the upper lap thereof travelling in substantially a horizontal plane, a longitudinal guide mounted on said frame for guiding the travel of said chain, a plurality of spaced apart relatively long and relatively short fingers carried by said chain, certain of said fingers being pivoted to said chain, said frame having a longitudinal slot formed therein through which said fingers project, and means carried by said frame and engageable with said pivoted fingers whereby said pivoted fingers may drop below the slot in said frame for momentarily stopping the material being conveyed across said frame.

11. A conveying mechanism for a stitching machine and the like comprising a frame, an endless belt mounted on said frame, a plurality of spaced apart fingers carried by said chain, and a material supporting station carried by said frame above said chain whereby the material to be conveyed is held out of engagement from certain of said fingers, and engaged by certain other of said fingers.

12. A conveying mechanism for a stitching machine and the like comprising a frame, an endless belt mounted on said frame, a plurality of spaced apart and of relatively different length fingers carried by said chain and a material supporting station carried by said frame adjacent said chain whereby the material to be conveyed is held out of engagement from the shorter fingers of said chain.

13. A conveying mechanism for stitching machines and the like comprising a frame, an endless belt mounted on said frame, a plurality of relatively long and relatively short spaced apart fingers carried by said chain, and means positioned adjacent to and above said chain for holding the material to be conveyed out of engagement with said relatively short fingers.

14. A conveying mechanism for stitching machines and the like comprising a frame, an endless belt mounted on said frame, a plurality of relatively long and relatively short spaced apart fingers carried by said chain, and an inclined material supporting station for holding the material out of engagement with said relatively short fingers.

15. A conveying mechanism for stitching machines and the like comprises a frame, a continuously driven endless chain mounted on said frame, a plurality of relatively long and relatively short spaced apart fingers carried by said chain, certain of said fingers being movable with respect to said chain for disengaging said finger from the material being conveyed across said frame, and a station on said frame positioned over said chain for holding the material in the path of said relatively long fingers and out of the path of said relatively short fingers.

16. A conveying mechanism for stitching machines and the like comprising a frame, a continuously driven endless belt mounted on said frame, fingers carried by said belt for intermittently moving material across said frame, and a station positioned over said chain for supporting the material out of engagement with certain of said fingers.

17. A conveying mechanism for stitching machines and the like comprising a frame, a continuously driven endless belt mounted on said frame, spaced apart fingers carried by said belt, means for disengaging certain of said fingers from the material as the same is being conveyed thereby, and a station positioned over said chain for holding the material out of engagement with certain other of said fingers.

18. A conveying mechanism for stitching machines and the like comprising a frame, a continuously driven endless belt mounted on said frame, spaced apart fingers carried by said belt, means for disengaging certain of said fingers from the material as the same is being conveyed thereby, and a station in the form of an inclined wire positioned adjacent said belt for holding the material to be conveyed out of engagement with certain other of said fingers.

IRVING R. METCALF.